United States Patent [19]

Beck et al.

[11] Patent Number: 5,125,332
[45] Date of Patent: Jun. 30, 1992

[54] NON-DESTRUCTIVE OVERLOAD APPARATUS FOR A MECHANICAL PRESS

[75] Inventors: Wilbert D. Beck, Shelby Township, Macomb County; Timmy L. Thompson, Canton, both of Mich.

[73] Assignee: Brothers Industries, Inc., Madison Heights, Mich.

[21] Appl. No.: 639,574

[22] Filed: Jan. 9, 1991

[51] Int. Cl.⁵ .................... B30B 15/14; B30B 1/06
[52] U.S. Cl. ................................ 100/50; 100/53; 100/99; 100/282; 72/19
[58] Field of Search .................... 100/48, 50, 52, 53, 100/43, 99, 257, 282; 72/19; 129/150, 129 A; 73/862.53, 862.54, 862.62, 862.64

[56] References Cited

U.S. PATENT DOCUMENTS

| | | | |
|---|---|---|---|
| 2,790,478 | 4/1957 | Shapiro | 100/50 X |
| 2,856,999 | 10/1958 | Wilhelm | 100/53 X |
| 3,081,725 | 3/1963 | Treer | 100/50 X |
| 3,095,803 | 7/1963 | Linderoth | 100/50 |
| 3,160,089 | 12/1964 | Platou | 100/53 X |
| 3,481,171 | 12/1969 | Alexander et al. | 72/20 |
| 3,487,772 | 1/1970 | Kraft | 100/53 |
| 4,010,679 | 3/1977 | Dybel | 100/53 |
| 4,202,433 | 5/1980 | Baltschun | 100/53 X |
| 4,260,305 | 4/1981 | Clopton | 73/862.62 X |
| 4,289,066 | 9/1981 | Proga | 100/53 |
| 4,456,112 | 6/1984 | Jones, Jr. | 100/53 X |
| 4,461,182 | 7/1984 | Jones, Jr. et al. | 100/99 X |
| 4,493,251 | 1/1985 | Green | 100/53 |
| 4,593,547 | 6/1986 | Heiberger | 72/19 X |
| 4,823,687 | 4/1989 | Yonezawa et al. | 100/53 |
| 4,864,876 | 9/1989 | Botzolakis et al. | 73/862.54 |
| 4,939,665 | 7/1990 | Gold et al. | 100/53 X |

FOREIGN PATENT DOCUMENTS

| | | | |
|---|---|---|---|
| 264351 | 1/1966 | Australia | 100/53 |
| 819543 | 11/1951 | Fed. Rep. of Germany | 100/50 |
| 2299589 | 8/1976 | France | 100/53 |
| 187568 | 2/1964 | Sweden | 100/282 |

Primary Examiner—Harvey C. Hornsby
Assistant Examiner—Stephen F. Gerrity
Attorney, Agent, or Firm—Harness, Dickey & Pierce

[57] ABSTRACT

A non-destructive overload apparatus for use in a mechanical press and a method of operation are disclosed. The overload apparatus includes an elastomeric body member operatively installed within the mechanical press such that a compressive force is exerted thereon upon loaded operation of the mechanical press. An electrical switch associated with the elastomeric body member is provided to generate a signal indicative of the mechanical press operating in excess of a maximum overload level.

20 Claims, 3 Drawing Sheets

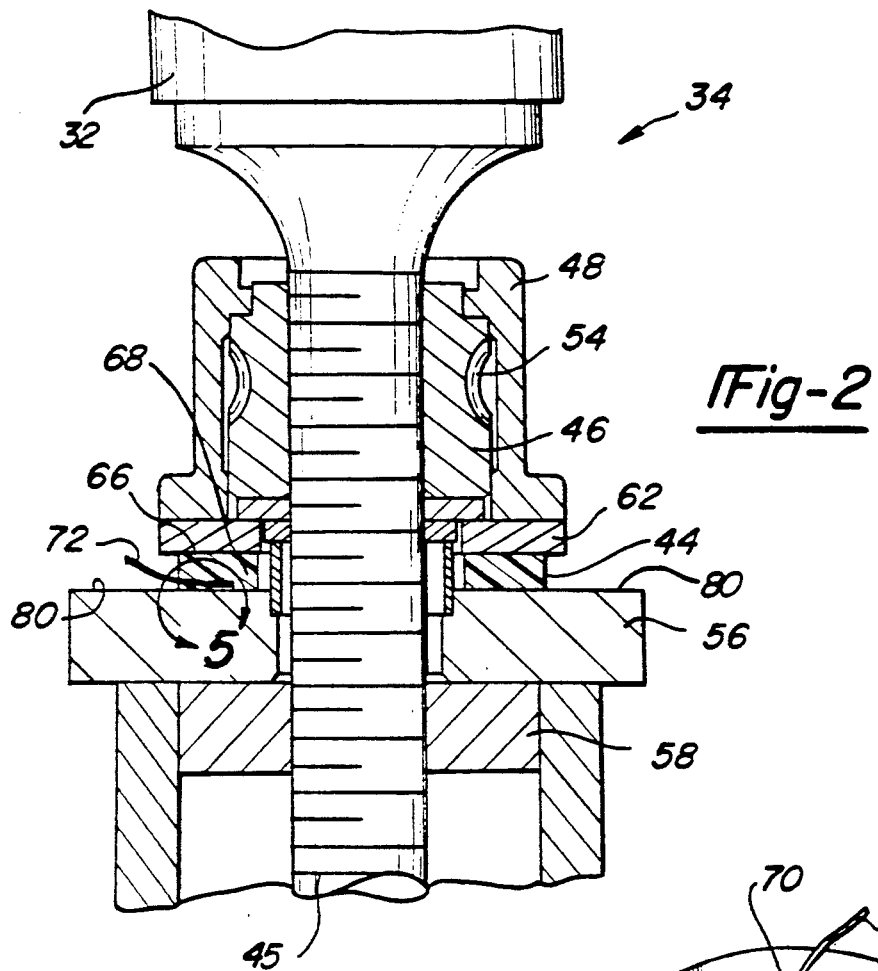
*Fig-2*
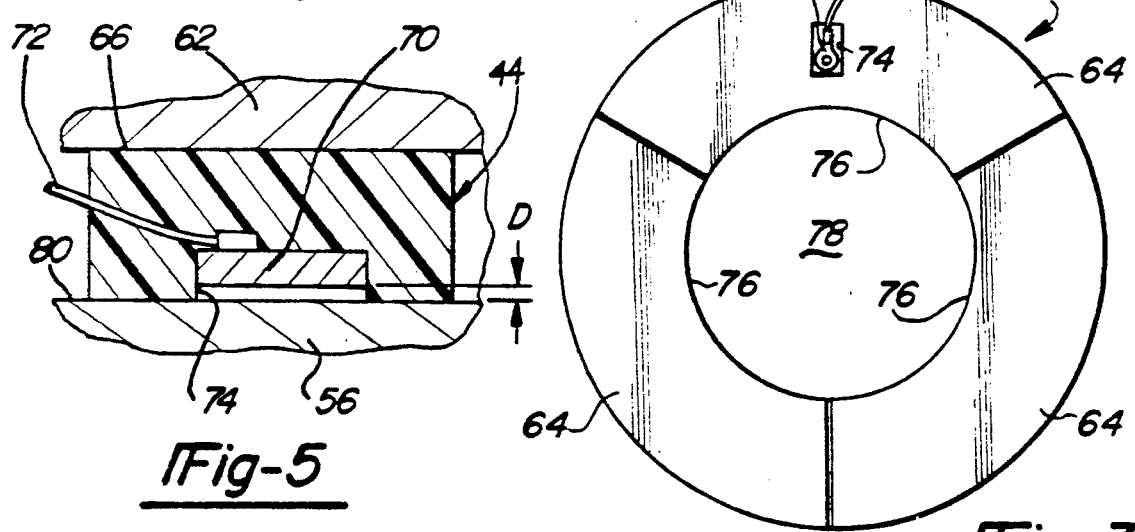
*Fig-5*
*Fig-3*
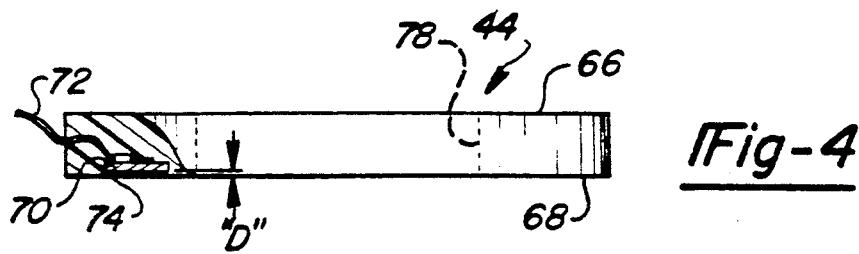
*Fig-4*

NON-DESTRUCTIVE OVERLOAD APPARATUS FOR A MECHANICAL PRESS

BACKGROUND OF THE INVENTION

The present invention relates to a method and apparatus for protecting a mechanical press from overloading and, more particularly, to a non-destructive elastomeric overload apparatus.

Mechanical presses are widely used in the metalworking industry for numerous part forming operations and processes. The force or load developed by a mechanical press varies with the position of the slide assembly. Therefore, mechanical presses are generally protected against "overloaded" operations which occur when the force developed by the mechanical press is greater than its maximum rated capacity.

There are generally two types of overload devices, typically referred to as "permanent" and "replaceable", which are conventionally installed on mechanical presses. Both types of overload devices are adapted to protect against an "overload" occurring near the bottom of the stroke. Various causes exist for overloading of a mechanical press. For example, a small error on the part of a die-setter in adjusting the shut height of the slide assembly can result in an overload condition capable of fracturing one or more of the frame members or the crown of the press. Even when the damage is less severe, such as breakage of a crankshaft or an eccentric shaft, substantial bearing damage almost always occurs. Overloading can also be caused by double blanks, by misfeeds or from attempting to form parts in an under-capacity press. The latter cause is commonly experienced in sheet-metal forming operations (i.e., automotive body parts) since mechanical presses are frequently operated above their maximum tonnage rating in an effort to produce a superior contoured surface finish on the workpiece.

Conventional "permanent" overload devices include sensors built into the dies, and hydraulic actuators mounted on the slide adjustment which are adapted to trip a limit switch if a present hydraulic load is exceeded. Alternatively, friction clutches and slip-type couplings have been used to permit the drive mechanism to slip under severe overload.

Most "replaceable" overload devices take the form of either a stretch link or a shear collar. Stretch link devices are generally used on under-driven presses and consist of a link member that will yield (i.e., stretch) if a given load is exceeded. A shear collar is a metallic ring typically mounted on the slide adjustment mechanism which is designed to shear (i.e., fracture) when the mechanical press is overloaded. The shear collar has an area of reduced cross-section which is designed to fracture at a predetermined overloaded condition for providing additional displacement of the slide assembly near the bottom of the stroke to relieve the overloaded condition.

Disadvantages commonly associated with "replaceable" overload devices include: (a) they must be replaced after each overload occurrence; (b) they fail under less than rated load upon extended cyclical use; and (c) multiple devices installed on a multiple point slide assembly may not fail simultaneously and, therefore, may potentially cause severe side loading on the mechanical press. Therefore, use of "replaceable" overload devices typically results in lost productivity due to equipment down time.

SUMMARY OF THE INVENTION

Accordingly, the present invention is directed to a non-destructive (i.e., "permanent") overload apparatus adapted to overcome the disadvantages associated with conventional overload devices. More particularly, the present invention is directed to an elastomeric overload apparatus having means for generating a signal indicative of the overload condition.

It is another object of the present invention to provide an elastomeric overload apparatus which is relatively inexpensive to manufacture and can be readily substituted for conventional "replaceable" metallic shear collars in virtually any mechanical press.

The improved overload apparatus, in a preferred embodiment, is an elastomeric collar having an electrically conductive switch member which is adapted to generate a signal indicative of the overload condition upon the elastomeric material being resiliently compressed beyond a predetermined axial displacement. The compressive displacement of the elastomeric overload apparatus is a function of the load exerted thereon and the compressive characteristics of the elastomeric material.

BRIEF DESCRIPTION OF THE DRAWINGS

Various advantages of the invention will become apparent to one skilled in the art after reading the following specification and by reference to the drawings, in which:

FIG. 2 is an enlarged cross-sectional view of a slide adjustment assembly incorporated in the mechanical press of FIG. 1 illustrating the operative placement of the elastomeric overload apparatus therein;

FIG. 3 is a bottom view of the elastomeric overload apparatus;

FIG. 4 is a side view of FIG. 3;

FIG. 5 is an enlarged cross-sectional view of a portion of FIG. 2; and

DETAILED DESCRIPTION OF THE PREFERRED EMBODIMENT

Figure 1:
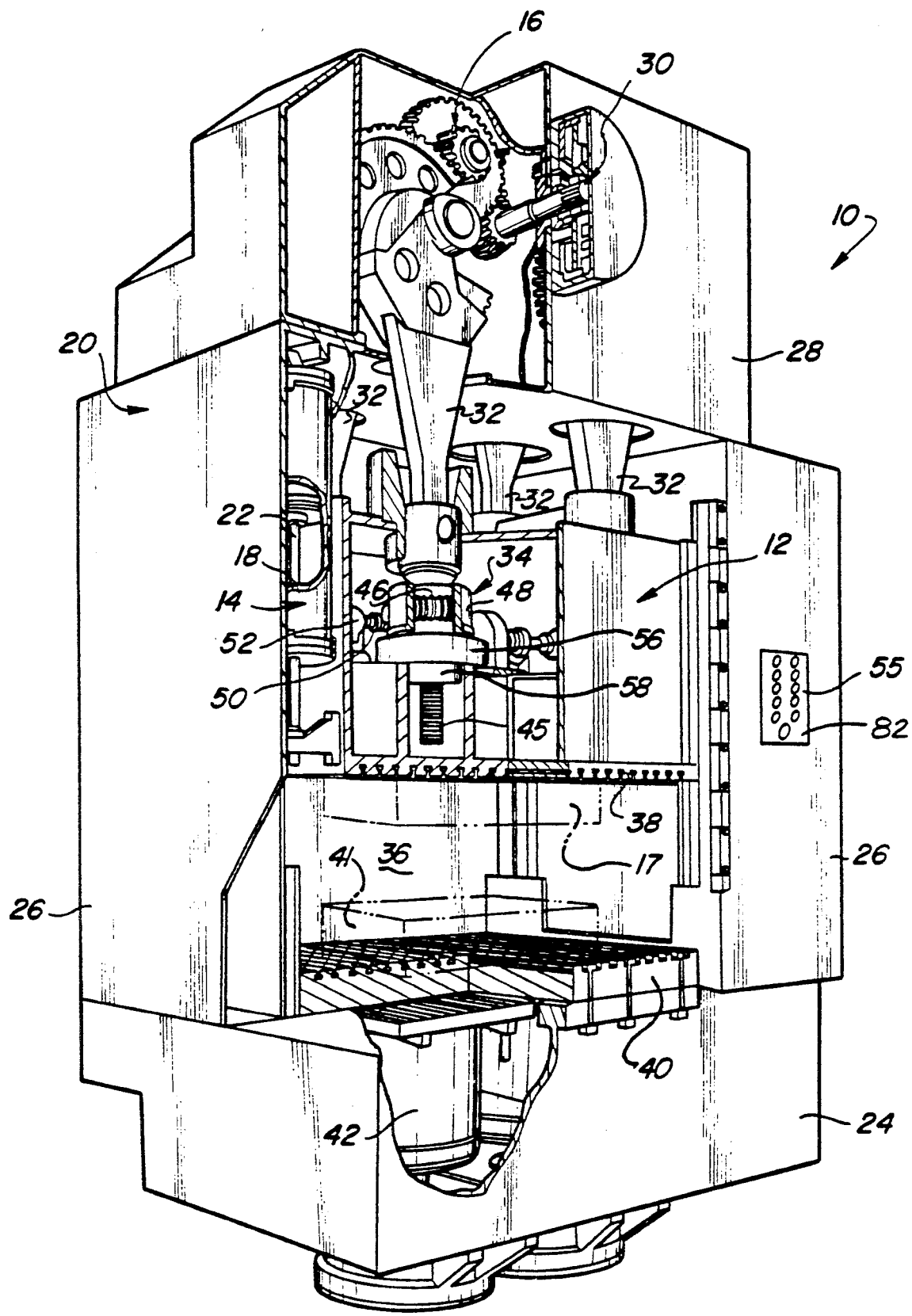
FIG. 1 is a perspective view, partially broken away, of an exemplary mechanical press incorporating the improved overload apparatus of the present invention.

According to the principles of the present invention, a "permanent" overload apparatus fabricated from a resilient elastomeric material is disclosed which is readily adapted to simple retrofit substitution into virtually any mechanical press, especially those equipped with conventional "replaceable" metallic shear collars. As such, it is to be understood that mechanical press 10, as illustrated in FIG. 1, is merely exemplary in nature. Only the primary components of mechanical press 10 which are required for understanding the operation of the improved overload apparatus are described in detail herein.

With particular reference now to FIG. 1, an exemplary mechanical press 10 of the type used for sheet-metal forming operations is illustrated. Mechanical press 10 is a straight-sided, single-action press having a rectilinearly movable ram or slide assembly 12, a plurality of pneumatic counterbalance devices 14 provided for assisting gear drive mechanism 16 in supporting the weight of slide assembly 12 and an upper die 17. More particularly, pneumatic counterbalance devices 14 include a pneumatic cylinder 18 attached to a stationary portion of press frame 20 and a piston and rod assembly 22 disposed therein having its rod end coupled to slide assembly 12 for linear reciprocable movement therewith.

In general, press frame 20 includes a bed assembly 24, opposite vertically extending columns 26 and an upper crown assembly 28. Housed within crown assembly 28 is a clutch and brake assembly 30 operatively associated with gear drive mechanism 16 for generating rectilinear movement of slide assembly 12 in a well-known manner. Means are provided for driving gear drive mechanism 16, such as an electric motor (not shown), in a manner also known in the art. Mechanical press 10 is shown to have a four point suspension for uniform loading of slide assembly 12. More particularly, four connector rods 32 are provided for interconnecting the four corners of slide assembly 12 to gear drive mechanism 16 to generate reciprocable linear movement ("stroke") of the slide assembly 12 upon actuation of gear drive mechanism 16.

Mechanical press 10 is shown to include a slide adjustment mechanism 34 for permitting a press operator to selectively set the desired shut height within work area 36. While slide adjustment mechanism 34 is illustrated as a motorized unit, it will be appreciated that the present invention is readily adaptable for application with virtually any type of slide adjustment mechanism. Upper and lower bolster plates 38 and 40, respectively, are securely fastened in facing relationship to slide assembly 12 and bed assembly 24, respectively, for supporting upper and lower die members 17 and 41, respectively, therefrom. Die cushions 42 are provided in association with bed assembly 24 for use in a conventional manner.

Slide adjustment mechanism 34 includes externally threaded rods 45 collinearly extending from a lower end of each of the four connector rods 32 and which threadably engage the internal threads of adjustment nuts 46. Each adjustment nut 46 is supported from slide assembly 12 and is adapted for rectilinear movement relative to its threaded rod 45 for causing corresponding movement of slide assembly 12. Such rectilinear movement of slide assembly 12 permits adjustment of the shut height associated with work area 36.

Each adjustment nut 46 is housed within a worm housing 48 having an aperture (not shown) through which a shaft 50 of a power operated until 52 extends for coupled engagement with external threads 54 formed on adjustment nuts 46. In this manner, selective energization of power operated until 52, such as by the press operator activating a push button on control panel 55, causes shaft 50 to rotatably drive nuts 46 for variably adjusting the shut height of slide assembly 12 within work area 36. As will be appreciated, each corner of slide assembly 12 preferably includes a substantially identical motorized slide adjustment mechanism 34 which may be electrically interlocked for concurrent operation upon selective energization by the press operator.

A stop block 56 and a lock nut 58 are located below each adjustment nut 46 with threaded rod 45 extending through stop block 56 such that the internal threads of lock nuts 58 engage the external threads of threaded rods 45. Stop blocks 56 are supported for movement with slide assembly 12 during shut height adjustments and are made from an electrically conductive material such as cast iron.

According to the teachings of the present invention, an improved "permanent" non-destructive overload apparatus, hereinafter referred to as elastomeric collar 44, is provided in operative association with slide adjustment mechanism 34 to detect "overload" conditions of mechanical press 10. In the disclosed embodiment, elastomeric collar 44 concentrically surrounds each of threaded rods 45 and is located intermediate stop blocks 56 and worm housings 48. More particularly, each of elastomeric collars 44 is installed between its respective stop block 56 and worm housing 48 and is retained therein by a non-resilient annular retainer 62. While the disclosed embodiment teaches installation of a plurality of elastomeric collars 44 corresponding to the number of threaded rods 45, it will be appreciated that various other combinations and operative placements within slide adjustment mechanism 34 are possible. Furthermore, it will also be appreciated that elastomeric collar 44, or a modification thereof, can be operably installed in other suitable positions within mechanical press 10 that are adapted to transmit a compressive force through elastomeric collar 44 which is developed upon actuation of gear drive mechanism 16.

Referring to FIGS. 2 through 5, elastomeric collar 44 is shown to be divided into a plurality of generally arcuate sections 64 for convenient and simple installation in mechanical press 10. Elastomeric collar 44 is operatively installed in mechanical press 10 to have a first surface 66 contiguously engaging retainer plate 62 and an opposite second surface 68 contiguously engaging stop block 56. Elastomeric collar 44 includes an electrically conductive ground switch member, such as a switch tab 70, that is electrically interconnected to a ground short wire 72 and which is secured in an aperture 74 at a predetermined axial displacement "D" from lower surface 68 thereof. Preferably, switch tab 70 is supported within aperture 74 so as to be substantially parallel to second surface 68 of elastomeric collar 44 in a generally facing relationship with respect to surface 80 of stop block 56. More preferably, switch tab 70 is molded within aperture 74 of elastomeric collar 44 during the initial molding process. Elastomeric collar 44 is shown to be cut into three 120° sections 64, each having a generally arcuate inner surface 76 which, when operatively assembled, define a central opening 78 adapted to concentrically surround threaded rod 45.

In operation, elastomeric collar 44 is designed to be resiliently compressed upon "loaded" stroking operation of mechanical press 10. "Loaded" operation refers to gear drive mechanism 16 generating a force upon the downward movement of slide assembly 12 which is transferred to and exerted on the workpiece (not shown) supported on lower die 41. In this manner, gear drive mechanism 16 drives connector rods 32 to transfer the force generated through slide adjustment mechanism 34 and, in turn, slide assembly 12. Therefore, under such "loaded" operation of mechanical press 10, a compressive force is exerted on elastomeric collar 44. More specifically, axial compression of elastomeric collar 44 occurs as threaded rod 45 causes nut 46 and worm housing 48 and, in turn, non-resilient retainer 62 to exert the compressive force on elastomeric collar 44. The magnitude of the compressive force exerted on elastomeric collar 44 is caused by and substantially equal to the force generated by drive mechanism 16 upon "loaded" actuation of mechanical press 10.

During "normal" loaded operation (i.e. when the force exerted is below a predetermined "overload" force level), the axial compression of elastomeric collar 44 does not result in ground switch tab 70 contacting electrically conductive surface 80 of stop block 56. Upon the occurrence of "overload" operation (i.e. when the force exerted is above the predetermined "overload" force level), elastomeric collar 44 is axially compressed until ground switch tab 70 contacts electrically conductive surface 80 of stop block 56. This contact generates an electrical ground to short signal that is indicative of the "overload" conditions. Preferably, the electrical signal is sent to a central controller device 82 having control circuit means for selectively disabling mechanical press 10 to interrupt "loaded" operation thereof, such as by disengaging clutch assembly 30 for free wheeling operation of gear drive mechanism 16.

Elastomeric collar 44 is designed to be resiliently compressible for causing contact between switch member 70 and electrically conductive surface 80 upon every occurrence of mechanical press 10 attempting to operate in excess of the predetermined "overload" force level. The predetermined "overload" force level is selected for preventing damage to mechanical press 10 and/or the dies. Following removal of the "overload" condition, elastomeric collar 44 is adapted to resiliently return to its original dimensions so as to permit repetitive stroking operation of mechanical press 10. As such, elastomeric collar 44 is a "permanent" resilient overload apparatus capable of a long and reliable service life.

It will be appreciated that axial compressive displacement of switch member 70 relative to surface 80 (dimension "D") is selected based on various parameters including the specific configuration, thickness and material from which elastomeric collar 44 is fabricated. These parameters define the amount of compressive displacement of elastomeric collar 44 produced in relation to the predetermined "overload" level (i.e., 120% of rated capacity) to be detected. As such, the compressibility characteristics of the elastomeric material from which elastomeric overload collar 44 is fabricated are a function of the compressive loading exerted thereon for establishing the specific "D" dimension associated with the particular predetermined "overload" level desired to be detected.

Preferably, elastomeric collar 44 is molded from a semi-rigid, high strength elastomeric material having a durometer of approximately 70-75 Shore D. One example of a suitable material is a polyurethane elastomer produced by Ciba-Geigy under the brand name of RP-6405. However, it will appreciated, that other suitable materials can be readily substituted therefor.

Figure 6:
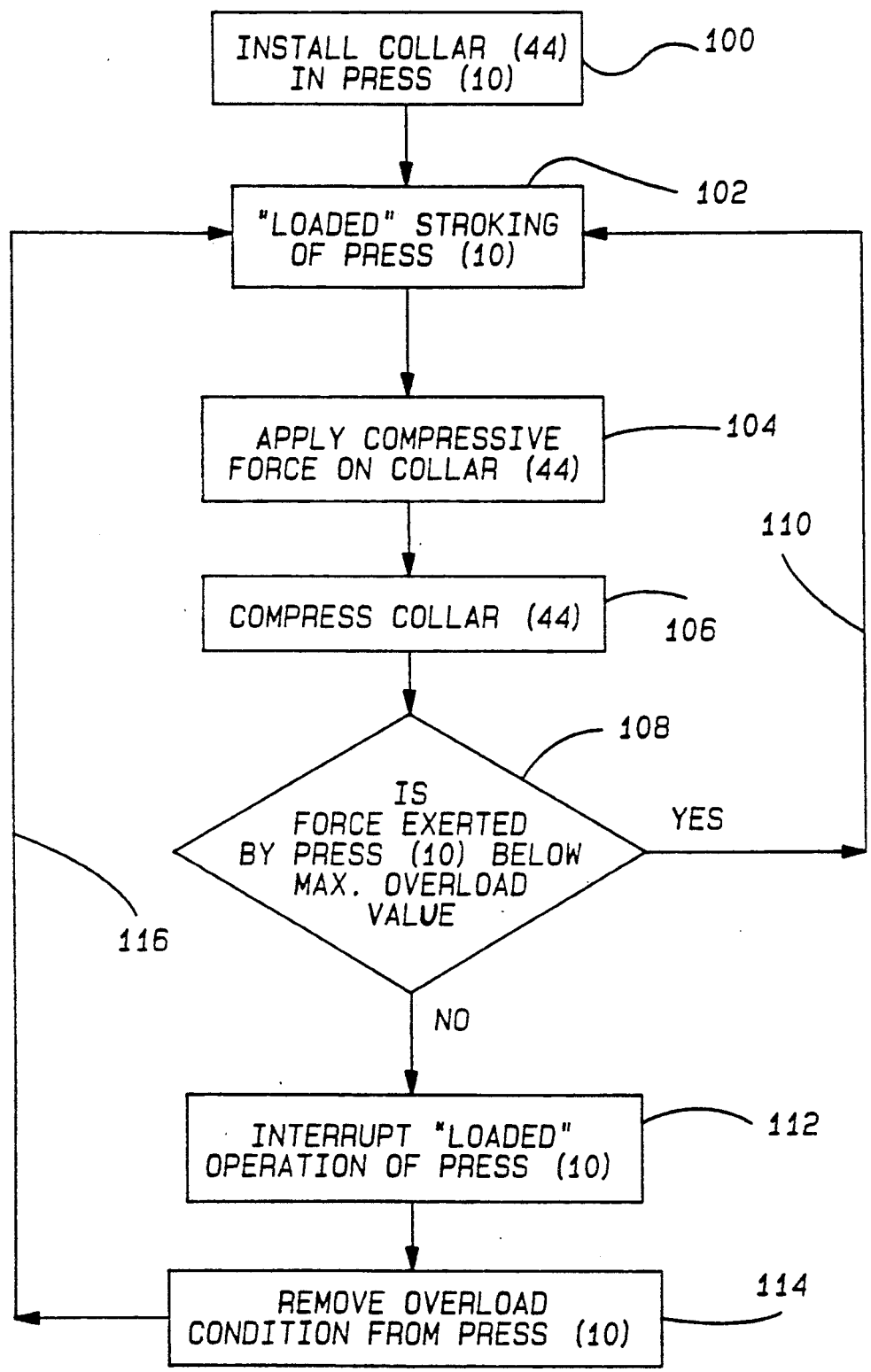
FIG. 6 is a flow chart illustrating the sequence of operations associated with a method of protecting the mechanical press of FIG. 1 from overloading.

With particular reference now to FIG. 6, a preferred method of protecting mechanical press 10 from operating in the "overload" condition will now be described. In general, the flow chart of FIG. 6 illustrates the sequential operations associated with detecting "overload" operation of mechanical press 10 utilizing elastomeric collar 44 and disabling mechanical press 10 in response thereto. More particularly, block 100 represents the step of installing elastomeric collar 44 within mechanical press 10 in an operative position such as that shown and described in reference to FIG. 2. Block 102 represents the "loaded" stroking operation of mechanical press 10. Block 104 represents the application of the compressive force exerted on elastomeric collar 44 upon "loaded" operation of mechanical press 10.

Block 106 represents the axial compression of elastomeric collar 44 which is generated as a function of the load exerted by mechanical press 10 on the workpiece. Block 108 is representative of the load "detecting" function of elastomeric collar 44 which is related to the amount of axial compression of elastomeric collar 44. It the force exerted by mechanical press 10 is below the predetermined maximum "overload" force level, the amount of axial compression of elastomeric collar 44 does not cause ground switch tab 70 to contact electrically conductive surface 80 of stop block 56. As such, continued operation of mechanical press 10 is permitted as indicated by flow line 110.

Block 112 represents the step of interrupting "loaded" operation of mechanical press 10 when the force exerted by mechanical press 10 exceeds the predetermined maximum "overload" force level. Therefore, ground switch tab 70 contacts electrically conductive surface 80 of stop block 56 for generating an electrical ground to short signal that is sent to central control device 82 for selectively interrupting operation of mechanical press 10. Finally, block 114 identifies to the operation of removing the "overload" condition for permitting continuational stroking "loaded" operation of mechanical press 10 as indicated by flow line 116.

Those skilled in the art can now appreciate that the present invention provides a novel, yet economical and reliable overload apparatus which eliminates the drawbacks associated with traditional "replaceable" metallic shear collars. It is to be understood that while this invention was described in connection with one particular example, many modifications can be made thereto without departing from the spirit of this invention after having the benefit of studying the specification, drawings and the following claims.

What is claimed is:

1. An overload apparatus for use in a mechanical press, said overload apparatus comprising:
    a resilient body member operatively installed within said mechanical press such that the output force generated upon actuation of said mechanical press is exerted as a compressive force on said resilient body member, said resilient body member being fabricated from an elastomeric material that is resiliently compressible as a function of said compressive force; and
    means for disabling said mechanical press upon said elastomeric body member being compressed a predetermined amount in response to said output force generated by said mechanical press exceeding a predetermined maximum overload force level, said disabling means including signal generating means for generating an electrical signal in response to said elastomeric body member being compressed said predetermined amount, and control means for selectively interrupting loaded operation of said mechanical press in response to said electrical signal.

2. The overload apparatus of claim 1 wherein said signal generating means includes an electrical switch member operatively supported from said elastomeric body member which is adapted to contact an electrically conductive surface in response to said elastomeric body member being compressed said predetermined amount upon said mechanical press generating said output force exceeding said maximum overload force level for generating said electrical signal in response thereto.

3. The overload apparatus of claim 2 wherein said elastomeric body member has a first surface adjacent said electrically conductive surface, said first surface of said elastomeric body member forming an aperture in which said switch member is supported at an axial distance from said electrically conductive surface, said axial distance corresponding to said predetermined amount of axial compression of said elastomeric body member caused upon said force generated by said mechanical press exceeding said predetermined maximum overload force level.

4. The overload apparatus of claim 2 wherein said elastomeric body member is operatively installed between a slide assembly and a drive mechanism of said mechanical press.

5. The overload apparatus of claim 4 wherein said press includes a bed assembly, and wherein said elastomeric body member is operatively installed within a slide adjustment mechanism associated with said mechanical press and which is provided for adjusting the shut height of said slide assembly relative to said bed assembly.

6. The overload apparatus of claim 4 wherein said elastomeric body member is an annular collar which is adapted to concentrically surround an end portion of a connector link provided for operatively interconnecting said drive mechanism to said slide assembly such that said compressive force is applied to said annular collar upon actuation of said mechanical press.

7. An overload apparatus for use in a mechanical press of the type having a drive mechanism generating rectilinear movement of a slide assembly relative to a bed assembly, said overload apparatus comprising:
   a resilient body member operatively installed between said slide assembly and said drive mechanism such that a force generated upon actuation of said drive mechanism is exerted as a compressive force on said resilient body member, said resilient body member being fabricated from an elastomeric material that is resiliently compressible as a function of said compressive force exerted on said resilient body member in response to downward rectilinear movement of said slide assembly toward said bed assembly;
   means for generating an electrical signal in response to said resilient body member being axially compressed a predetermined amount as a result of said force exceeding a predetermined maximum overload force level; and
   control means for selectively interrupting operation of said mechanical press in response to said electrical signal.

8. The overload apparatus of claim 7 wherein said signal generating means is an electrical switch member interconnected to a control system of said mechanical press, whereby upon said mechanical press generating said force exceeding said maximum overload force level said elastomeric body member is resiliently compressed until said switch member contacts an electrically conductive surface for generating said electrical signal in response thereto, said electrical signal adapted to actuate said control system for disabling operation of said mechanical press.

9. The overload apparatus of claim 8 wherein said elastomeric body member has a first surface said electrically conductive surface, said first surface of said elastomeric body member forming an aperture in which said switch member is supported at an axial distance from said electrically conductive surface, said axial distance selected to correspond to said predetermined amount of axial compression of said elastomeric body member generated upon said mechanical press operating at said maximum overload force level.

10. The overload apparatus of claim 9 wherein said elastomeric body member is operatively installed within a slide adjustment mechanism associated with said mechanical press and which is provided for adjusting the shut height of said slid assembly relative to said bed assembly.

11. The overload apparatus of claim 10, wherein said elastomeric body member is an annular collar which is divided into a plurality of generally arcuate members, said collar adapted to concentrically surround an end portion of a connector link provided for coupling said drive mechanism to said slide assembly.

12. An overload apparatus for use in a mechanical press, said overload apparatus comprising:
   an annular collar concentrically surrounding a portion of a connector link provided for operatively interconnecting a drive mechanism to a slide assembly within said mechanical press, said annular collar being fabricated from an electrically non-conductive material that is resiliently compressible as a function of a compressive force exerted thereon in response to an output force generated by said drive mechanism upon actuation of said mechanical press;
   an electrical switch member secured within an aperture formed in said annular collar, said switch member adapted to contact an electrically conductive surface of said mechanical press following a predetermined amount of compression of said annular collar generated by said compressive force when said output force generated by said drive mechanism exceeds a maximum overload force level, said electrical switch member operable to generate an electrical signal in response to contact with said electrically conductive surface; and
   an electrical control system operable for receiving said electrical signal and selectively interrupting loaded operation of said mechanical press in response thereto.

13. The overload apparatus of claim 12 wherein said annular collar has a first surface adjacent said electrically conductive surface, said first surface of said elastomeric body member forming said aperture in which said switch member is supported at an axial distance displaced from said electrically conductive surface, said axial distance corresponding to said predetermined amount of axial compression of said annular collar caused upon said output force generated by said mechanical press exceeding said predetermined maximum overload force level.

14. The overload apparatus of claim 12 wherein said mechanical press includes a bed assembly, and wherein said annular collar is operatively installed within a slide adjustment mechanism associated with said mechanical press and which is provided for adjusting the shut height of said slide assembly relative to said bed assembly.

15. The overload apparatus of claim 12 wherein said annular collar is fabricated from an elastomeric material.

16. The overload apparatus of claim 12 wherein said annular collar is divided into a plurality of generally arcuate members.

17. The overload apparatus of claim 12 wherein interruption and removal of said overload force from said mechanical press causes removal of said compressive force from said annular collar for permitting said switch member to return to a position of non-contact with respect to said electrically conductive surface.

18. An overload apparatus for use in a mechanical press of the type having a drive mechanism generating rectilinear movement of a slide assembly relative to a bed assembly, said overload apparatus comprising:

an annular collar operatively installed between said slide assembly and said drive mechanism such that a force generated upon actuation of said drive mechanism is exerted thereon, said annular collar being fabricated from an elastomeric material that is resiliently compressible as a function of said force exerted thereon upon downward rectilinear movement of said slide assembly toward said bed assembly;

switch means for generating an electrical signal in response to said annular collar being compressed a predetermined amount as a result of said force exceeding a predetermined maximum overload force level, said switch means supported within an aperture formed in said annular collar at an axial distance displaced from an electrically conductive surface, said axial distance selected to correspond to said predetermined amount of axial compression of said annular collar that is generated upon said mechanical press operating above said maximum overload force level, whereby upon said mechanical press operating above said maximum overload force level said annular collar is resiliently compressed until said switch means contacts said electrically conductive surface for generating said electrical signal in response thereto; and control means for selectively interrupting operation of said mechanical press in response to said electrical signal.

19. The overload apparatus of claim 18 wherein said annular collar is operatively installed within a slide adjustment mechanism associated with said mechanical press and which is provided for adjusting the shut height of said slide assembly relative to said bed assembly.

20. The overload apparatus of claim 18 wherein said annular collar is divided into a plurality of generally arcuate members.

* * * * *